United States Patent [19]

Tyree, Jr. et al.

[11] 4,344,291

[45] Aug. 17, 1982

[54] CRYOGENIC CABINET FREEZER

[75] Inventors: Lewis Tyree, Jr., 145 Briarwood Ave. N., Oak Brook, Ill. 60521; James R. Missig, Joliet; George D. Rhoades, LaGrange, both of Ill.

[73] Assignee: Liquid Carbonic Corporation, Chicago, Ill. ; by said James R. Missing and George D. Rhoades

[21] Appl. No.: 144,594

[22] Filed: Apr. 28, 1980

[51] Int. Cl.$^3$ ............................................. F25D 25/00
[52] U.S. Cl. ......................................... 62/62; 62/168; 62/216; 62/384
[58] Field of Search ................... 62/384, 309, 62, 216, 62/165, 168

[56] References Cited

U.S. PATENT DOCUMENTS

| | | | |
|---|---|---|---|
| 2,780,923 | 2/1957 | Jones | 62/239 |
| 3,063,258 | 11/1962 | Szachnitowski | 62/309 |
| 3,385,073 | 5/1968 | Snelling | 62/45 |
| 3,447,336 | 6/1969 | Gramse | 62/239 |
| 3,708,995 | 1/1973 | Berg | 62/63 |
| 3,792,595 | 2/1974 | Willis | 62/414 |

OTHER PUBLICATIONS

Brochure "Rapid Freeze"–Victory Manufacturing–1976.

*Primary Examiner*—Ronald C. Capossela
*Attorney, Agent, or Firm*—Fitch, Even, Tabin, Flannery & Welsh

[57] ABSTRACT

A cabinet cooler or freezer which efficiently utilizes cryogenic refrigeration either with or without mechanical refrigeration. The freezer intermittently freezes relatively large batches of food by efficiently utilizing the natural expansion effect of a liquid cryogen, in combination with mechanical circulation by blowers, to create an overall circulation that efficiently removes heat from the food. A secondary circulation effect is induced, in a manner similar to the operation of a jet pump, which amplifies the circulation and allows $CO_2$ to be employed with modulating valve control to achieve uniformly low temperature throughout the cabinet without snow build-up on the cabinet bottom. Some cabinet versions create a cyclonic circulation pattern about a vertical axis that is particularly effective.

16 Claims, 9 Drawing Figures

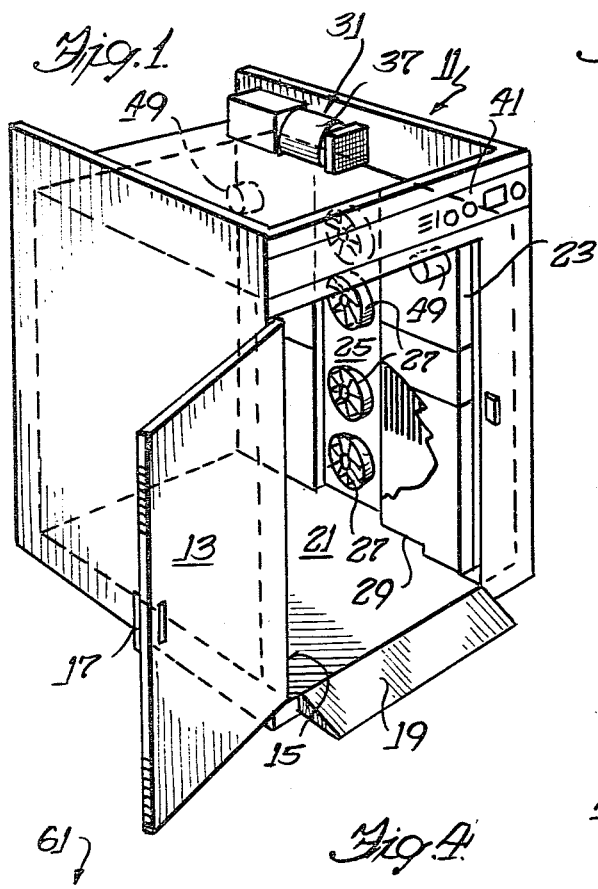
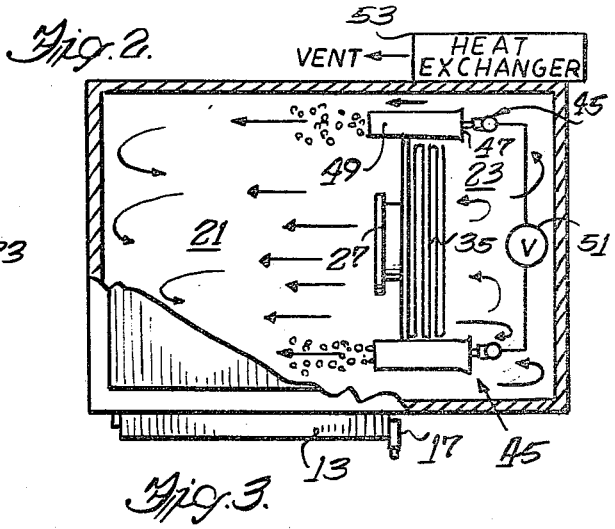
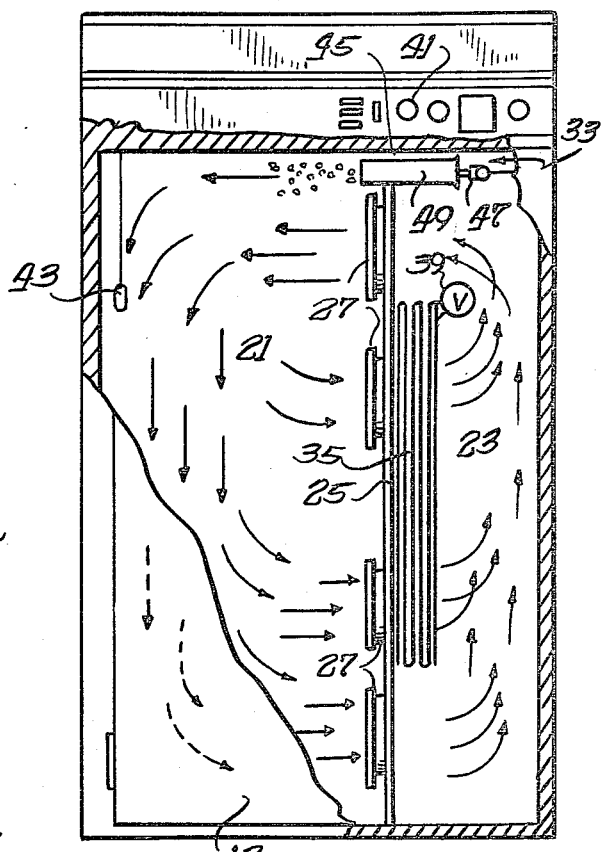
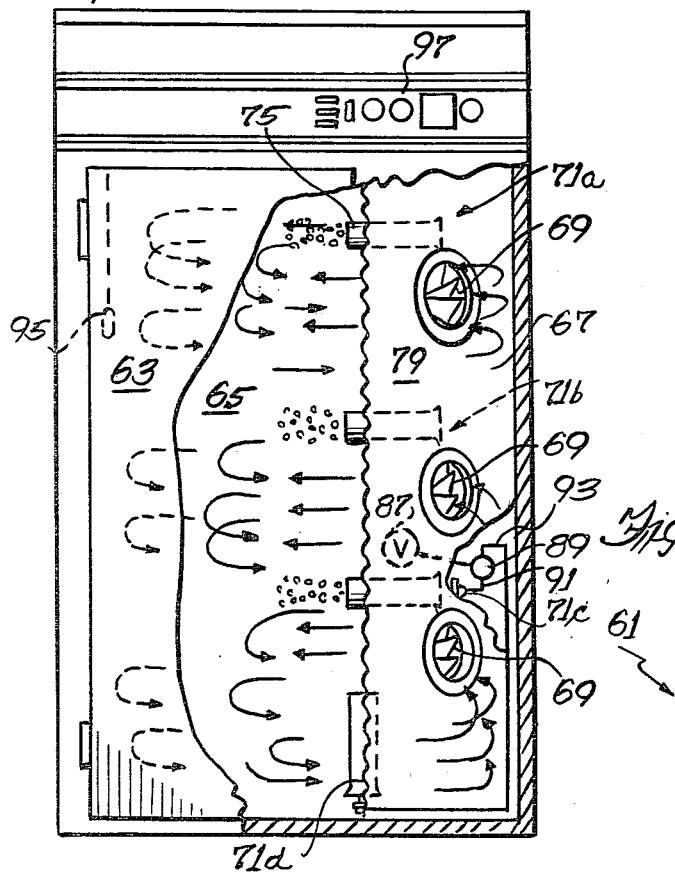
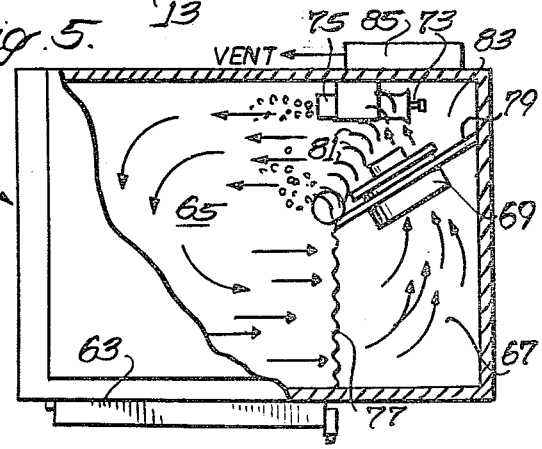

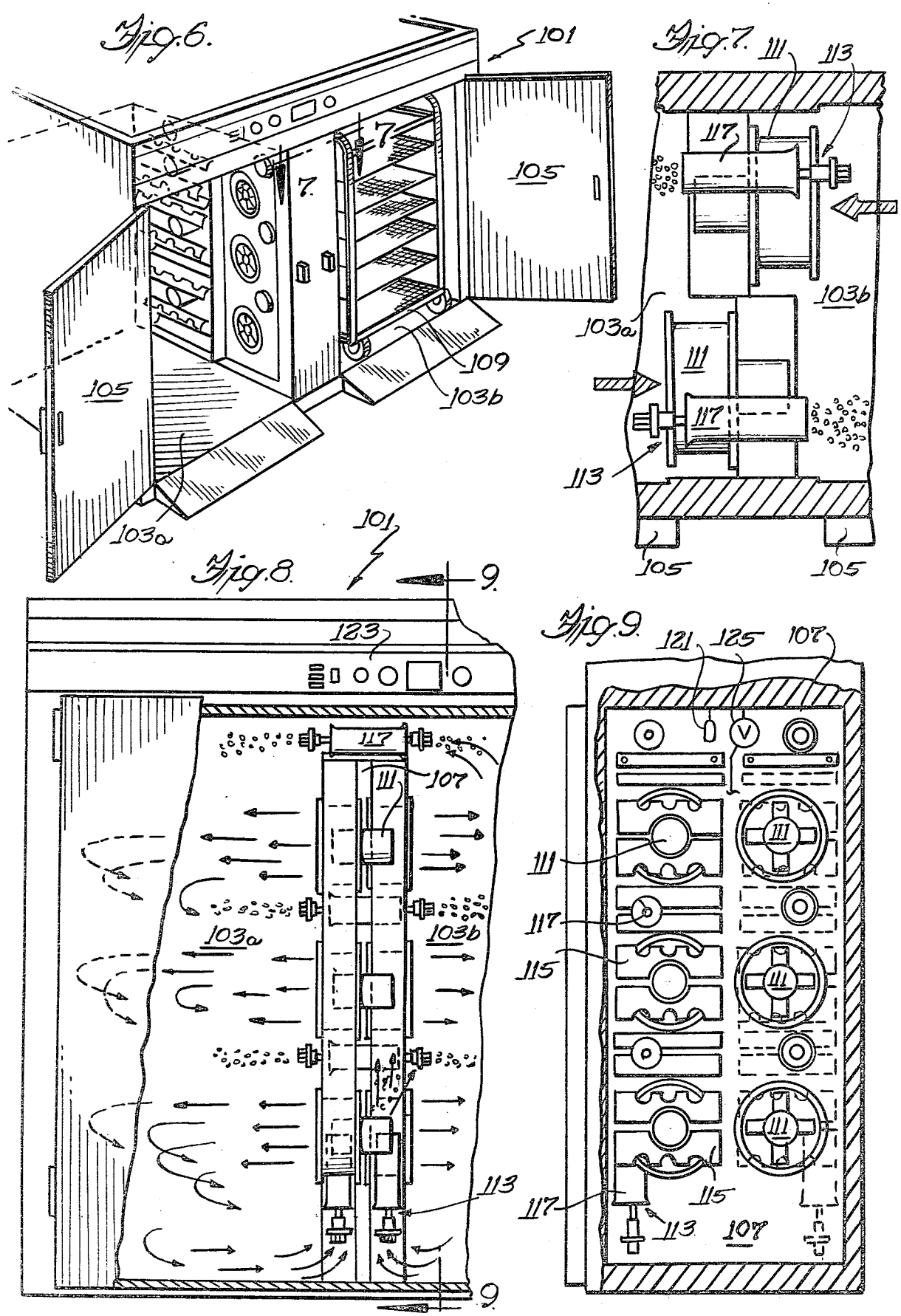

CRYOGENIC CABINET FREEZER

This invention relates to cryogenic cooling apparatus and more particularly to apparatus for using a cryogen to cool a load within a specifically defined chamber or compartment.

BACKGROUND OF THE INVENTION

Over the years, the advantages of cryogenic cooling in being able to produce lower temperatures than conventionally available mechanical freezing apparatus has become apparent and has been found to be efficient for commercial applications. Cryogenic fast-freezers have proved to be of significant benefit to users desiring relatively low-temperature environments, for example, in the region of $-30°$ F. or $-40°$ F., and examples of such cryogenic freezing units are set forth in U.S. Pat. Nos. 3,660,985, 3,672,181, 3,754,407 and 3,815,377. Various of the apparatus illustrated in these patents were particularly designed for use with carbon dioxide, which offers particular advantages when cooling or freezing using temperatures in the aforementioned range.

U.S. Pat. No. 4,127,008, issued Nov. 28, 1978 to Lewis Tyree, Jr., shows a variety of cryogenic cooling apparatus including some which are designed to employ a closed chamber in which a static or stationary load can be placed, for example, by rolling in a wheeled cart or rack carrying the product disposed on vertically spaced shelves. The cooling is accomplished in the illustrated devices solely by the use of cryogen which was expanded in a heat-exchanger and recovered, requiring slightly more sophisticated equipment. It is felt that there is a commercial market for somewhat simpler devices which so efficiently utilize cryogen to cool or freeze a load within a compartment that expenditure of the cryogen can be permitted while remaining cost effective.

SUMMARY OF THE INVENTION

The invention provides a cabinet cooler or freezer which efficiently utilizes cryogenic refrigeration, with or without mechanical refrigeration, to rapidly and efficiently lower the temperature of a product load. As such, in one aspect, the invention provides apparatus which is capable of intermittently handling relatively large batches of product on an efficient and economically attractive basis. The invention utilizes the natural expansion effect of cooling with a liquid cryogen that is being vaporized, in combination with the mechanical circulation of the gaseous atmosphere by blowers or fans, to achieve an efficient circulation pattern that establishes surface heat-exchange with the product being cooled and the cold environment. A secondary circulation effect is induced, in a manner similar to the operation of a jet pump, which amplifies the circulation and contributes to overall efficiency.

BRIEF DESCRIPTION OF THE DRAWINGS

FIG. 1 is a perspective view, with portions broken away, of a single-door freezing apparatus utilizing both cryogenic and mechanical refrigeration and embodying various features of the invention;

FIG. 2 is a top view with a major portion broken away to show the interior of the apparatus of FIG. 1;

FIG. 3 is a front view with portions broken away and with arrows provided to diagrammatically show the atmospheric flow patern achieved within the apparatus of FIG. 1;

FIG. 4 is a view similar to FIG. 3 of an alternative version of a freezer cabinet using all cryogenic refrigeration and embodying various features of the invention;

FIG. 5 is a top view with a large portion broken away to show the interior of the cabinet of FIG. 4;

FIG. 6 is a perspective view, similar to FIG. 1, of a two-door all-cryogenic freezing cabinet embodying various features of the invention;

FIG. 7 is a top sectional view taken generally along the line 7—7 of FIG. 6;

FIG. 8 is a front view, with portions broken away, of the apparatus shown in FIG. 6; and FIG. 9 is a side sectional view taken generally along the line 9—9 of FIG. 8.

DETAILED DESCRIPTION OF THE PREFERRED EMBODIMENTS

Illustrated in FIGS. 1–3 is a cabinet-type refrigeration device which includes a cabinet 11 formed with insulated walls for maintaining a low-temperature environment therewith. A hinged door 13 is provided to close an opening 15 through the front wall of the cabinet, which door can be locked in closed position by a latch 17. A short ramp 19 is preferably provided to allow a wheeled cart to be easily moved into and out of the cooling enclosure or region 21 defined by the cabinet 11 and closed by the door 13.

A refrigeration-generation region 23 is provided within the cabinet and is generally defined by a partition 25 which extends for a major portion of the height of the cabinet but which terminates slightly below the upper edge. The rear wall of the cabinet and the interior surface of the closed door 13 are parallel and extend from the boundary with the region 23, generally defining the cooling enclosure. Four circular openings are provided in the partition 25, and four fans or blowers 27, driven by electric motors, are mounted in the openings in the partition. A rectangular opening 29 is also provided at the bottom of the partition 25.

Because the cabinet 11 is provided with refrigeration equipment designed for the creation of temperatures well below the freezing point of water, it is generally referred to as a freezer. However, it should be understood that this is simply dependent upon the time that the load is allowed to remain in the cabinet and/or the temperture at which the refrigeration equipment is set to maintain the enclosure 21, and accordingly it could be used and referred to as a cooler. The refrigeration-generation region 23 is provided with a mechanical refrigeration system 31 and a cryogenic refrigeration system 33 which can be both operated at the same time or either can be operated to the exclusion of the other. The fans 27 operate to circulate the vapor in the same manner whether or not the cryogenic system is operating. The cryogenic system 33 will usually be operated only in conjunction with the operation of the mechanical refrigeration system 31.

By "mechanical refrigeration system" is meant one which applies thermodynamics in a manner wherein a cooling medium, or refrigerant, goes through a cycle so that it is recovered and reused. Generally, a vapor-compression cycle is employed wherein the liquid refrigerant is evaporated in low pressure region, i.e. an evaporator, to produce cooling, subsequently withdrawn to a compressor where the pressure (and temperature) of the gaseous refrigerant is raised, then transferred to a condenser wherein its heat is discharged to the environment and the refrigerant liquifies, and is thereafter stored in a reciever until such time that it is to be recycled through an expansion valve back into the evaporator. By a "cryogenic refrigeration system" is meant one wherein a liquified gas, usually carbon dioxide or nitrogen, is allowed to expand and evaporate, often producing a temperature of about $-110°$ F., or below. Usually, the cryogen is expended, e.g. by discharge to the atmosphere, after the desired use has been made of its capacity to absorb heat in carrying out an attendant cooling or freezing operation.

The mechanical refrigeration system 31 in the illustrated embodiment includes an evaporator 35 wherein a refrigerant, such as a Freon, is allowed to evaporate to a vapor or gas. The evaporator 35 is supplied from a receiver which is part of a compressor-condenser combination 37 located atop the cabinet 11. A control valve 39 allows the flow of Freon liquid from the higher pressure receiver into the evaporator 35. The cabinet 11 is provided with an overall control system 41 which allows it to be set in different modes of operation and which receives a signal from a sensor 43 that gives an indication of the temperature at an upper location within the refrigeration region 21. The valve 39 when signalled by the control system allows the liquid Freon to flow from the higher pressure region in the receiver to the lower pressure region in the evaporator 35.

The control system 41 causes the four blowers 27 to run whenever the door 13 is latched shut and the freezer is actuated in any mode of operation, creating a primary circulation of the cabinet atmosphere. The lowermost three fans 27 are operated to suck the gaseous atmosphere from the lower regions of the refrigeration region 21 and direct the atmosphere to the right as depicted in FIG. 3. The uppermost blower 27 is operated to take suction from its right-hand side and discharge to the left-hand side as indicated in FIG. 3. This creates an upward flow along the right-hand wall in the refrigeration-generation region 23, and if desired, baffles can be provided to assist this flow pattern.

Disposed at a level above the uppermost blower are a pair of cryogen injection devices 45 in the form of injection nozzles 47 connected to a source of high pressure cryogen. Although nitrogen or some other suitable cryogen may be employed, liquid carbon dioxide is preferred, and the nozzles 47 are preferably spring-loaded expansion nozzles designed to efficiently produce a stream of $CO_2$ snow and $CO_2$ vapor, similar to those disclosed in U.S. Pat. No. 3,815,377, issued June 11, 1974, the disclosure of which is incorporated herein by reference.

Each of the nozzles 47 discharges at a location within a surrounding inducer 49 which preferably has a flared entrance and amplifies the circulation, thereby increasing efficiency. The expansion of the liquid $CO_2$ through an orifice at the end of the nozzle 47 into the inducer and the discharge of this stream out the open left-hand end creates a significant secondary circulation of gas within the interior of the cabinet. The action is similar to that of a jet pump and causes a substantial volume of gas to be sucked into the right-hand entrance of the inducer 49, which is discharged at a high velocity along with the vapor and snow being created at the nozzle orifice. Not only does the effect of the pair of inducers 49, plus the uppermost fan 27, balance the three lower fans operating in the opposite direction to create a good flow pattern throughout the entire refrigeration zone 21, but the dispersion of the subliming $CO_2$ snow within the gaseous circulation pattern suspends the snow particles and distributes them excellently throughout the zone so that, even after operation for an extended period of time, no accumulation of snow is created at the bottom of the left-hand refrigeration zone 21.

The injection devices 45 are connected in parallel downstream of a modulating valve 51 which changes the pressure of the liquid cryogen flowing to the injection devices 45 in response to a signal received from the control system 41. To prevent pressure from building-up within the cabinet, cryogen vapor is vented from the cabinet whenever the cryogen system is operating. When the cryogen is $CO_2$, the cold vapor is discharged through a heat-exchanger, which may be mounted on the rear wall of the cabinet 11 and which may exhaust through a check valve to a vent conduit that preferably discharges to the atmosphere exterior of the plant wherein the cabinet freezer is being operated. The incoming stream of liquid $CO_2$ from a suitable source, usually a standard high-pressure liquid $CO_2$ storage tank, passes through the heat-exchanger 53 where the high-pressure liquid is cooled by heat-exchanger with the cold exiting vapor.

The combination of the modulating valve 51 which varies the rate at which liquid cryogen is injected in combination with the secondary circulation created by the inducers 49 results in an extremely effective use of cryogen and is particularly advantageous in its overall energy efficiency when its is employed simultaneously with the mechanical refrigeration system 31 that can effectively provide cooling in upper temperature range. For example, the cryogen refrigeration system 33 may be operated during the time wherein product load is accepting more refrigeration than the mechanical system 31 can supply—which is usually during the early part of a refrigeration cycle, e.g. when certain food products are being initially crusted in order to seal in flavor and create a superior texture.

As an example of the operation of the freezer cabinet 11, a wheeled cart containing an open rack or framework upon which are supported a plurality of layers of shallow trays containing food products, such as especially baked goods or specialty entrees, is pushed into place through the opening 15. After the door 13 has been closed and latched, the control system 41 is set to the desired mode of operation, for example, rapid-freezing, and actuated to begin the cycle. The four blowers 27 are immediately started, and the valve 39 automatically supplies liquid Freon to the evaporator through which the blowers are blowing the atmosphere within the cabinet.

Because the temperature being sensed initially is quite high, likely close to ambient, the control system 41 generally operates the cryogen injection devices 45 at a high rate. Assuming that liquid $CO_2$ is being expanded, the modulating valve 51 opens relatively wide and may apply nearly full pressure of liquid cryogen to the snow-making nozzles 47. This results in an immediate discharge of $CO_2$ snow and vapor from the left-hand end of the two inducers 49 which creates the desired secondary circulation by sucking gaseous atmosphere through the flared entrances. As a result, the flow of cold vapor and finely dispersed particles of snow is outward across the upper layers of the load on the cart being refrigerated and then downward along the left-hand wall of the refrigeration zone 21 whence it is drawn across the lower layers of product, from left to right, by the flow patterns set up by the lowermost three blowers 27.

As the temperature within the refrigeration zone 21 begins to drop to near the preselected temperature and is detected by the sensor 43, the main control system 41 causes the modulating valve 51 to begin to close slightly, thus lowering the pressure of the liquid $CO_2$ and reducing the rate of $CO_2$ flowing to the cryogen injection devices 45 and the rate at which $CO_2$ snow and vapor are injected via the nozzles. When a certain predetermined temperature is reached within the cabinet, for example, $-80°$ F., the control system 41 may close the modulating valve 51 entirely, thus discontinuing operation of the cryogen refrigeration system 33 until such time as the temperature might again rise above this predetermined temperature. Of course, different predetermined temperatures may be set for different food products and when different cryogens are used.

The cryogen refrigeration system 33 may be set to operate for a total "freeze time" duration. Thereafter, the mechanical refrigeration system 31 continues to operate and may operate intermittently when the cabinet temperature begins to stabilize. The mechanical refrigeration system 31 maintains the atmosphere within the refrigeration zone a desired holding temperature range, typically, about $-10°$ F. to $0°$ F. Once an overall set time expires, the control system 41 may be programmed to light an indicator light and/or cause an audible signal to be sounded to alert personnel in the plant that the cycle has been completed.

Shown in FIG. 4 is a cabinet freezer 61 which is similar in outward appearance to the cabinet freezer 11 but which is provided with an all-cryogenic refrigeration-generation system. The cabinet includes a single door 63 which provides access to a refrigeration zone 65 which is substantially the same as that previously described. A refrigeration-generation zone 67 on the right-hand side of the refrigeration zone 65 in FIG. 5 is of substantially the same size as the zone 23; however, the refrigeration-generation equipment is different. In the illustrated embodiment, three blowers 69 are employed in combination with four cryogen injection units 71a, b, c and d, each of which includes the combination of an injection nozzle 73 and an inducer 75 of the same type as hereinbefore described with regard to the FIG. 1 embodiment. Instead of employing a baffle to separate the two zones, porous screen material 77 is employed which extends vertically from top to bottom and which merely provides protection against the possibility of inadvertent contact with the blades of the blowers while allowing free-flow of gaseous atmosphere back and forth between the two zones.

The three blowers 69 are mounted in a main baffle 79 which extends from the right-hand wall generally diagonally across the region to a point generally adjacent the screen 77. The blowers 69 are mounted in three apertures in the baffle main 79 and are of a design wherein the gaseous stream discharged by the blower passes over the motor housing, as best shown in FIG. 5. Disposed in generally converging relationship to the main baffle is a row of curved vanes or thin baffles 81 which extend substantially from the floor of the cabinet to the ceiling. The vanes 81 are uniformly spaced apart and serve to smoothly turn the vapor discharge from the blowers into a flow pattern across the refrigeration zone 65 from right to left, as shown by the pattern of arrows in FIG. 5. The vanes 81 serve a dual purpose, as described hereinafter in more detail, of creating a relatively high-pressure region 83 between the main baffle 79 and the row of vanes.

Three of the cryogenic injection devices 71a, b and c and their associated inducers 75 are mounted horizontally at a vertical level just slightly higher than the three blowers 69, as shown in FIG. 4. The fourth cryogen injection device 71d is mounted vertically near the bottom of the cabinet. With respect to the three horizontal devices, the inducers 75 are mounted in passageways cut out from the vanes 81 so that their entrances lie on the right-hand side of the row of vanes, in the high-pressure region 83, and each exit is on the left-hand side of the vanes. As a result of this design and location, the high-pressure gas region at the entrance of the inducers 75 has the effect of supercharging the inducers and creating an even more effective secondary circulation of vapor throughout the refrigeration zone 65.

The fourth vertically oriented inducer 71d is located generally adjacent the the vertex of the region defined by baffle 79 and the row of vanes 81, as seen in FIG. 5, and is directed upward. The two vanes 81 nearest the door are shortened to allow the inducer unit to be accomodated. In the all-cryogenic cabinet freezer 61, the cryogen is employed to provide refrigeration throughout the entire temperature range wherein cooling or freezing is being accomplished. For efficient performance when only a low rate of refrigeration need be supplied, the modulating function referred to hereinbefore is important, and the vertical disposition of the fourth injection unit and its location near the bottom are also important, particularly when the cryogen is carbon dioxide. As can be seen from FIG. 4, the flow pattern purposely established in the refrigeration zone 65 is generally stratified, as typified by the pattern of arrows. This arrangement assures the desired flow through relatively narrow horizontal passageways between layers of trays on a wheeled cart or rack. The vertically disposed injection unit 71d not only assures effective mixing of vapor between these stratified layers when its discharge intersects with the discharges from the three blowers 69, but it also assures that a significantly colder region is not created near the bottom of the refrigeration zone 65 wherein snow might possibly accumulate.

Although the supply of liquid cryogen to the injection units 71 can be in the same manner as hereinbefore described with respect to the freezer 11, preferably a piping arrangement is employed which directs a stream of cryogen of relatively higher vapor content to the vertical injection unit as compared to the streams which are supplied to three horizontal injection units. In this respect, a heat-exchanger 85 is located at the vapor vent outlet, and a modulating valve 87 is located in the supply line for the incoming $CO_2$ stream which is the same as previously described. However, the cryogen from the valve 87 flows to a horizontal manifold 89 in the refrigeration-generation zone 67 from which the four inducer units are supplied. The liquid in the top region of the manifold will tend to have a greater vapor content than the liquid in the lower region.

The three horizontal injection units 71a, b and c are supplied by piping 91 which connects to the bottom of the manifold 89, and the vertical injection unit 71d is supplied through piping 93 which connects to the top of the manifold. Accordingly, the liquid cryogen flowing in the manifold having the higher vapor content is preferentially directed to the lower injector 71d. This has the advantage of creating a somewhat lesser percentage of $CO_2$ snow at the lower injector and a greater percentage of vapor, thus achieving an even greater upward secondary circulation to accomplish the desired mixing. Likewise, the relatively greater percentage of snow exiting from the three horizontal injection units places the snow in the vicinity of the product being cooled and/or frozen where it is most effective. The secondary circulation created by the inducers 75, together with the blowers 69, creates a cyclonic effect about a vertical axis which very efficiently cools material even when disposed in layers of closely spaced shallow trays.

The overall function of the freezer cabinet 61 is generally the same as that earlier described except that, of course, all of the refrigeration results from the initial injection of cryogen. The three blowers 69 are set to run continuously, with the injection units 71 being operated in response to the temperature sensed by a sensor 95 and the particular program which has been set into the main control system 97.

Although the cabinet 61 illustrated and described is designed to accept and freeze a stationary batch of food product disposed in shallow trays and supported upon a transportable cart having multiple shelves, the cooling principles embodied in the apparatus design can be used effectively to cool throughout a defined chamber on compartment. For example, a spiral endless conveyor may be located within a relatively large cabinet having a lower entrance and an upper exit upon which food products can be continuously transported while they are being cooled and frozen by the cyclonic circulation effect that is created about a central axis, that may substantially concide with the axis of the spiral conveyor.

Depicted in FIGS. 6 through 9 is a freezer 101 which resembles the freezer 61 insofar as it contains an all cryogenic refrigeration system; however, it is designed to have substantially twice the capacity by being provided with two separate refrigeration zones 103a and b to which access is provided by separate doors 105. A refrigeration generation zone 107 is located centrally between the two refrigeration zones. Although the freezer 101 can be operated with a load in only one of the two zones 103, by eliminating the operation of certain of the cryogen injection units directed toward the zone not being used, it is far more economical and efficient to load both of the zones simultaneously and carry out concurrent cooling and/or freezing operations in both zones at the same time. A representative wheeled cart 109 is shown in the right hand compartment in FIG. 6 which has a plurality of horizontal racks or shelves that may be spaced closer together depending upon the particular product being frozen.

The equipment in the refrigeration generation zone 107 includes six blowers 111 of the type described with respect to the freezer 61, which discharge the vapor stream over their electric motor housings, being aligned in two side-by-side vertical rows. As best seen in FIG. 7, the three blowers 111 in the front row nearest the doors 105 take suction from the left-hand zone 103a and discharge into the right-hand refrigeration zone 103b, whereas the three blowers 111 in the rear row operate vice-versa. Accordingly, as generally depicted by the arrow pattern in FIG. 8, the blowers tend to create a relatively stratified, cyclonic circulation throughout both refrigeration zones. This circulation is extremely effective in achieving contact between the cold vapor and the layers of food product being cooled which are supported on the many-tiered wheeled carts 109, and it greatly adds to the overall efficiency of the freezer.

The actual refrigeration is achieved by cryogen injection units 113 which are substantially the same as those described with respect to the freezer 61, but twice in number. In this respect, a horizontal injection unit 113 is associated with and positioned just slightly above each of the blowers 111 (as best seen in FIG. 9) which unit discharges in the same direction as the blower, and these six injection units thus reinforce the cyclonic movement of the gaseous atmosphere within the cabinet which achieves the extremely efficient cooling and/or freezing of the product disposed in relatively shallow layers. Flow diffusing baffles 115 are preferably located in the regions of discharge to spread the discharge stream from each of the blowers 111 so that intermingling and mixing occurs between it and the adjacent secondary circulation streams emanating from the inducers 117 of the injection units 113.

In addition, a single vertically oriented injection unit 113 is located in association with each vertical row of blowers. As in the case of the freezer 61, each of the two vertically oriented injection devices 113 is directed to discharge into a region where it will intersect with the discharge streams from the three blowers 111 disposed thereabove it. This arrangement eliminates the possibility of stratification occurring on one vertical level which might create a different temperature there than at other levels and also assures that a particularly cold region is not created near the bottom of the zone as a result of the tendency of cold, more dense vapor to gravitate downward.

A temperature sensor 121 may be located in the rear of the refrigeration-generation region 107 that is connected to a main control unit 123. Alternatively, a pair of sensors may be located one in each of the refrigeration regions with the control system being designed to simply average the temperatures which it interprets from the signals received. A single modulating valve 125 can be employed to control the rate at which cryogen is simultaneously injected from all of the units 113. Alternatively, one modulating valve can be used to control the front four injector units and another to control the rear four units, in which case four of the units can be removed from operation in the case when only a single load is being frozen in one refrigeration zone 103—by simply having the control system 123 shut down one modulating valve.

Preferably, a horizontal manifold (not shown) is also used so that the two vertically oriented injection units 113 are supplied by connections coming from the upper region of the manifold and the six horizontally directed injection units 113 are supplied with cryogen from the lower region of the manifold. This arrangement achieves the effect described hereinbefore with respect to the refrigeration-generation system for the cabinet 61 depicted in FIGS. 4 and 5, namely the discharge of a larger percentage of $CO_2$ snow from horizontally oriented injectors 113.

The double-row, oppositely-facing arrangement of blowers and injectors creates a cyclonic movement of the atmosphere within the cabinet that is extremely effective in cooling product on multiple-tiered carts 109 of the type shown. Moreover, precise regulation of the cryogen injection rates by the modulating valve allows accurate control of temperature as low as about $-80°$ F. without the accumulation of snow on the cabinet floor.

Although the invention has been described with regard to certain preferred embodiments, it should be understood that various changes and modifications as would be obvious to one having the ordinary skill in this art may be made without departing from the scope of the invention which is defined in the appended claims. For example, automatically operated defrosters can be incorporated in association with the evaporators in the cabinets 11. Particular features of the invention are emphasized in the claims which follow.

What is claimed is:

1. A method of refrigerating product within a first vertically extended cooling region, which method comprises
   employing fan means to establish a primary circulation of gas throughout said first region,
   expanding liquid $CO_2$ through orifice means having inducer means with a substantially completely open flared entrance located in generally surrounding relationship to said orifice means so that the expanding liquid creates $CO_2$ snow and vapor and induces a secondary circulation of gas within said first region that effects rapid sublimation of the snow created plus distribution of the cold vapor throughout said cabinet,
   said fan means being located so as to cause a flow of gas through said inducer means even when liquid $CO_2$ is not being expanded,
   sensing the temperature within said cabinet,
   modulating the continuous flow of liquid $CO_2$ through said orifice means in response to changes sensed in the temperature, and
   removing $CO_2$ vapor from said cabinet, whereby efficient cooling of said product is accomplished without build-up of $CO_2$ snow at the bottom of said first region.

2. A method in accordance with claim 1 wherein said inducer means is supercharged closely downstream from said fan means.

3. A method in accordance with claim 2 wherein baffling is provided downstream from the discharge from said fan means to create a high pressure region with the entrance to said inducer means being located in said high pressure region and the exit from said inducer means being located downstream from said baffling.

4. A method in accordance with claim 1 wherein said modulating is effected by changing the area of said orifice.

5. A method in accordance with claim 4 wherein said orifice-area-changing is effected by varying the pressure of the liquid cryogen pressure being supplied to said orifice means.

6. A method in accordance with claim 1 wherein said secondary circulation is created by a plurality of orifice-inducer combinations which direct cryogen vapor in different directions.

7. A method in accordance with claim 6 wherein a plurality of fans are provided which discharge in a horizontal direction to create a cyclonic circulation about a vertical axis in said first region.

8. A method in accordance with claim 7 wherein an upwardly directed orifice-inducer combination is located generally below and closely downstream from the horizontal discharge from said fans.

9. A method in accordance with claim 8 wherein the flow of liquid $CO_2$ being supplied to said orifice-inducer combinations from a single supply line is split and vapor-rich liquid is supplied to said upwardly directed orifice-inducer combination and vapor-poor liquid is supplied to the remainder of said orifice-inducer combinations.

10. A method in accordance with claim 1 wherein fan means is provided at different vertical locations which discharge in substantially opposite horizontal directions.

11. A method in accordance with claim 10 wherein evaporator means from a separate mechanical refrigeration system is disposed in said second region and wherein refrigerant is supplied to said evaporation means and liquid $CO_2$ is expanded through said orifice means when the temperature sensed is in one range and wherein only is refrigerant supplied to said evaporation means when the temperature sensed is within a certain predetermined lower range.

12. A method of refrigerating product in a cabinet partially defined by a pair of parallel vertical walls, which method comprises
   creating a primary circulation of gas within the cabinet by a plurality of fans which discharge gas horizontally and generally along one parallel wall and which are located at different vertical levels,
   expanding liquid cryogen through orifice means having inducer means located in surrounding relation thereto and alongside one of said fans so that the expanding liquid creates cryogen vapor and induces a secondary circulation of gas within the cabinet, also generally directed along said one wall, which is supplementary to said primary circulation,
   at least some of said fans and said orifice-inducer means being arranged to take suction from along the other of said two parallel walls whereby vapor streams move within said cabinet in substantially horizontal directions having the general pattern of a cyclone revolving about a vertical axis,
   sensing the temperature within said cabinet,
   modulating the rate of expansion of liquid cryogen in response to changes in the temperature that are sensed, and
   removing cryogen vapor from the cabinet in general proportion to its creation.

13. A method in accordance with claim 12 wherein an upwardly directed orifice-inducer combination is located generally below and closely downstream from the horizontal discharge from said fans.

14. A method of refrigerating product within a cabinet having first and third vertically extended cooling regions separated by a second vertically extending intermediate region, which method comprises
   employing two sets of fan means to establish a primary circulation of gas throughout each of said first and third regions,
   expanding liquid $CO_2$ through orifice means having inducer means located in said second region in generally surrounding relationship to said orifice means and alongside one of said fan means so that the expanding liquid creates $CO_2$ snow and vapor and induces a secondary circulation of gas within each of said first and third regions that is supplementary to said primary circulation and effects rapid sublimation of the snow created plus distribution of the cold vapor throughout said cabinet,
   said two sets of fan means and said inducer means being arranged to each take suction from one of said first and third cooling regions and to discharge into the other of said cooling regions in a manner to create vapor streams which move in substantially horizontal directions having the general pattern of a cyclone revolving about a vertical axis, sensing the temperature within said cabinet, modulating the flow of liquid $CO_2$ through said orifice means in response to changes sensed in the temperature, and removing $CO_2$ vapor from said cabinet, whereby efficient cooling of said product is accomplished without build-up of $CO_2$ snow at the bottom of said first and third regions.

15. A method in accordance with claim 14 wherein a plurality of fans discharge into said first region and take suction from said third region and a plurality of additional fans take suction from said first region and discharge into said third region, thereby creating a generally cyclonic flow pattern about a generally vertical axis.

16. A method in accordance with claim 15 wherein two of said orifice-inducer means are located in the bottom portion of second region and direct streams of cryogen vapor upward so as to intersect with the discharge from each of said pluralities of fans.

* * * * *